United States Patent
Aggarwal et al.

(10) Patent No.: US 9,319,207 B2
(45) Date of Patent: Apr. 19, 2016

(54) SYSTEM AND METHOD FOR WINDOWING IN FULL-DUPLEX COMMUNICATIONS

(71) Applicant: AT&T Intellectual Property I, L.P., Atlanta, GA (US)

(72) Inventors: Vaneet Aggarwal, Parsippany, NJ (US); Rittwik Jana, Parsippany, NJ (US); Christopher W. Rice, Parsippany, NJ (US); Nemmara K. Shankaranarayanan, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 283 days.

(21) Appl. No.: 13/685,121

(22) Filed: Nov. 26, 2012

(65) Prior Publication Data

US 2014/0146715 A1    May 29, 2014

(51) Int. Cl.
*H04L 5/14*    (2006.01)

(52) U.S. Cl.
CPC ........................................ *H04L 5/14* (2013.01)

(58) Field of Classification Search
CPC ....... H04L 5/14; H04L 5/1423; H04L 5/1438; H04L 5/1469
USPC ................................................. 370/276–296
See application file for complete search history.

(56) References Cited

U.S. PATENT DOCUMENTS

| | | | | |
|---|---|---|---|---|
| 6,847,653 | B1* | 1/2005 | Smiroldo | 370/462 |
| 7,010,607 | B1* | 3/2006 | Bunton | 709/228 |
| 8,320,321 | B2* | 11/2012 | Joshi et al. | 370/330 |
| 2002/0054574 | A1* | 5/2002 | Beach et al. | 370/279 |
| 2003/0103644 | A1* | 6/2003 | Klayh | 382/100 |
| 2003/0179719 | A1* | 9/2003 | Kobayashi et al. | 370/282 |
| 2008/0031133 | A1* | 2/2008 | Kendall | 370/231 |
| 2010/0027565 | A1* | 2/2010 | Gupta et al. | 370/475 |

OTHER PUBLICATIONS

Wikipedia, "Transmission Control Protocol: Difference between revisions", Nov. 4, 2012.*

* cited by examiner

*Primary Examiner* — Paul H Masur
*Assistant Examiner* — Kabir Jahangir

(57) ABSTRACT

A system and method for establishing windows that govern the exchange of acknowledgements in a full-duplex communication. The window is established for two nodes which transmit asymmetric frame sizes in full-duplex mode. The window is related to the size of the asymmetric frames. Frames are exchanged in full-duplex between the two nodes, and the window size is defined as enabling the nodes to send data until the number of unacknowledged frames at the nodes is less than or equal to the window size, at which point acknowledgments are exchanged simultaneously. In sending the acknowledgment, both nodes can send acknowledgments simultaneously in full-duplex in the same frequency bin.

20 Claims, 5 Drawing Sheets

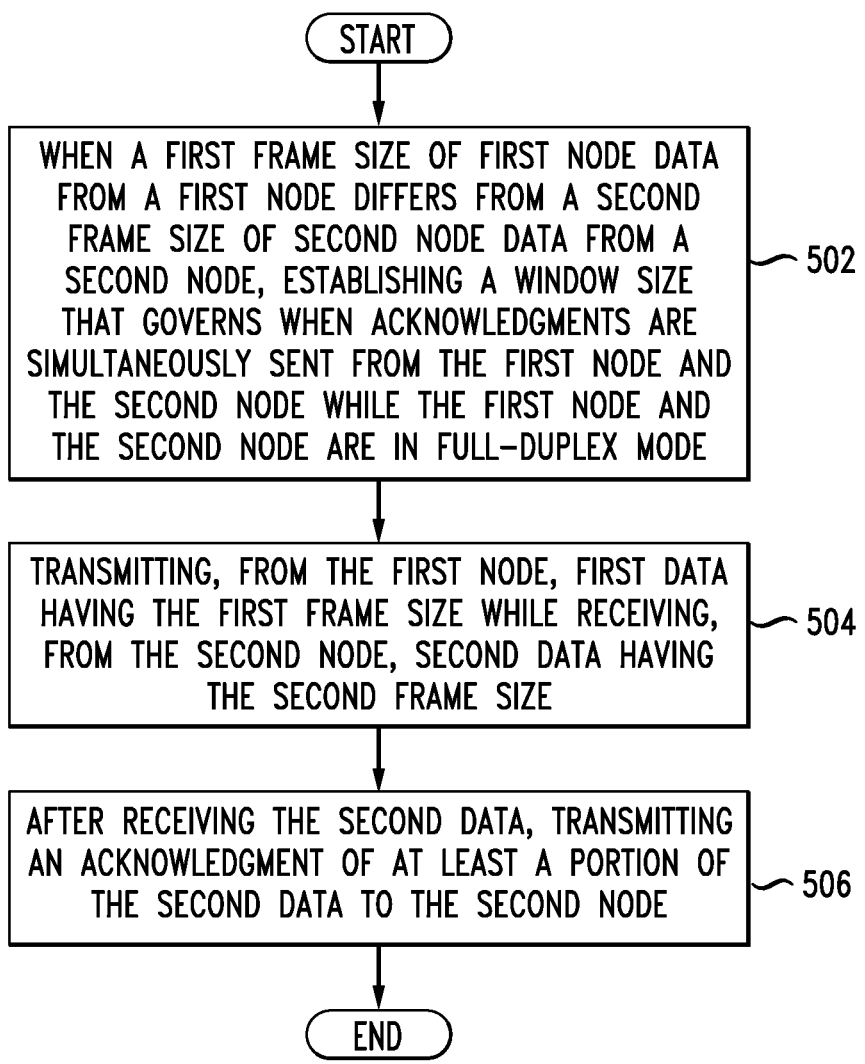

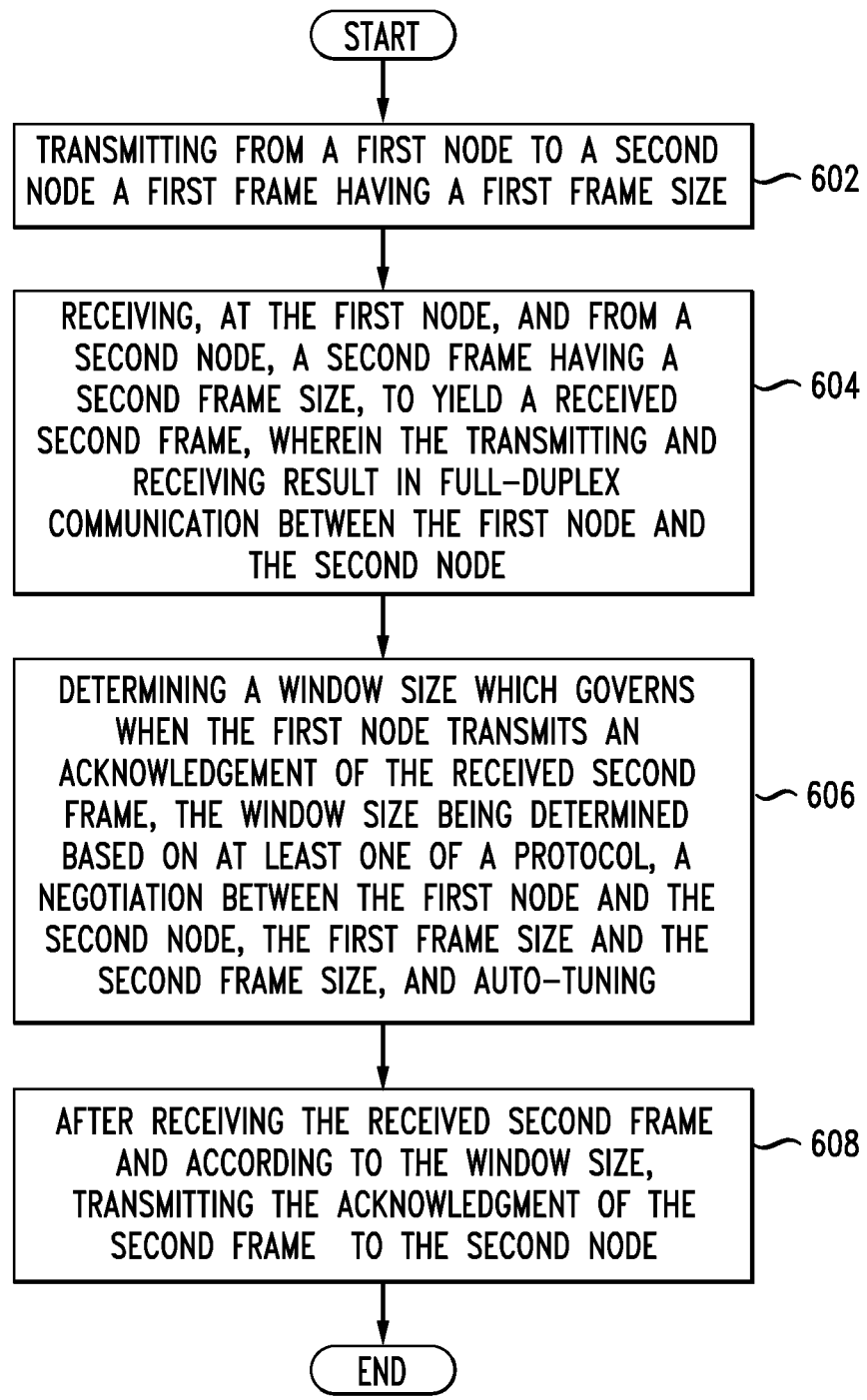

SYSTEM AND METHOD FOR WINDOWING IN FULL-DUPLEX COMMUNICATIONS

BACKGROUND

1. Technical Field

The present disclosure relates to synchronization of data frame transmission in full-duplex transmissions and more specifically to reducing transmission lulls by identifying a window size and synchronizing acknowledgments of transmitted frames of data based on the window size.

2. Introduction

During half-duplex communications between two nodes, one node transmits data and the second node, upon receiving the data, sends an acknowledgment signal indicating that the second node properly received the data. When the second node has data to transmit, it transmits the data to the first node and the first node, upon receiving this data from the second node, sends an acknowledgment signal indicating that the first node properly received the data. While the first node is sending data to the second node, or the second node is sending data to the first node, other communications are limited. No simultaneous transmission and reception in a single frequency bin (a specific time interval associated with a specific frequency band) occur. This back-and-forth pattern of communication, known as half-duplex, is inefficient in comparison to full-duplex communications, where both nodes can simultaneously transmit and receive data in a single frequency band or channel at a given time.

However, the efficiency of full-duplex communications is reduced when, after transmitting data, a transmitting node waits a significant amount of time for the receiving node to send an acknowledgment that the data was received. In full-duplex communication, the receiving node may simultaneously be transmitting a frame and thus must wait until its transmission is complete before sending an acknowledgment for the frame it received. Acknowledgments also aid in knowing if data was corrupted or otherwise not properly received, necessitating retransmission of the data.

BRIEF DESCRIPTION OF THE DRAWINGS

FIG. 5 illustrates an example method embodiment;

FIG. 6 illustrates a second example method embodiment.

DETAILED DESCRIPTION

Figure 1:
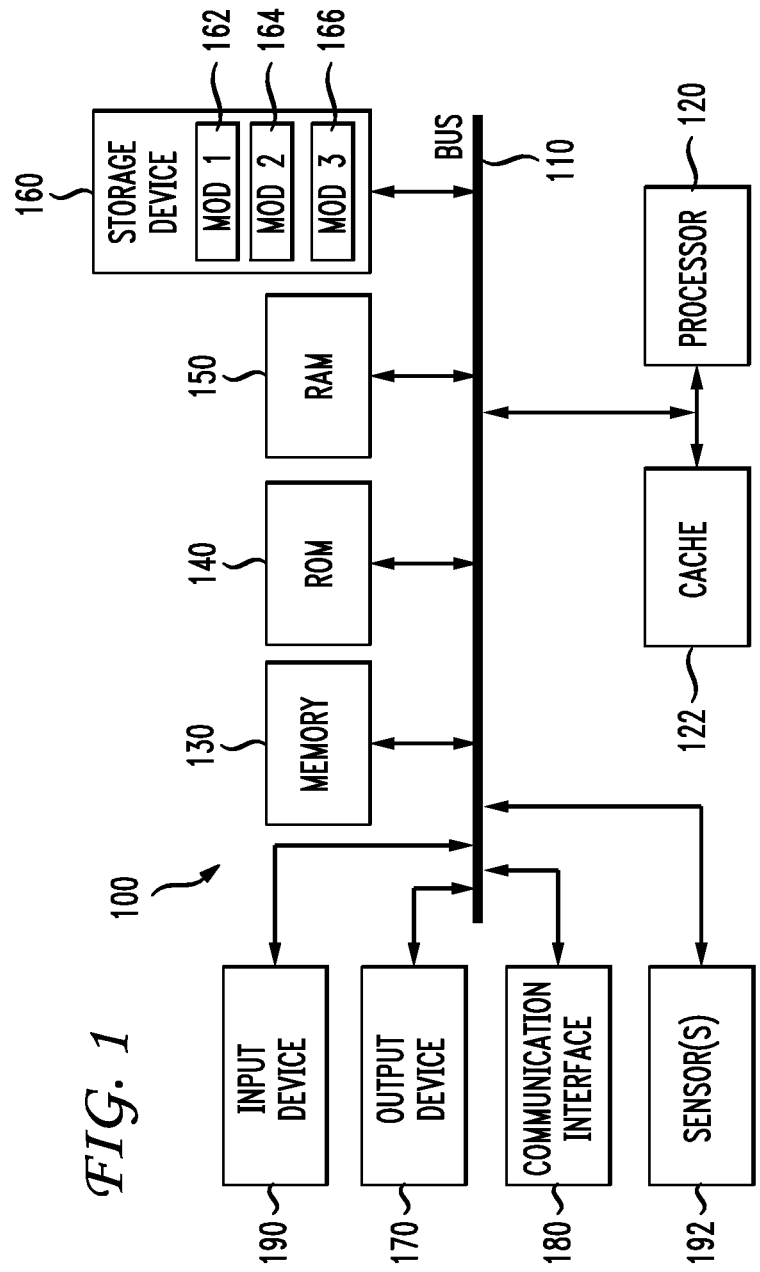
FIG. 1 illustrates an example system embodiment.

A system and method are disclosed which improve bandwidth and throughput of a full-duplex communication link by defining a window size. Before discussing the full-duplex acknowledgement approach disclosed herein, a comment is made about half-duplex communication. To schedule and plan when the nodes will transmit and/or receive data in half-duplex, nodes compliant with industry standards (such as IEEE 802.11) utilize a Media Access Control protocol (MAC) to schedule and coordinate transmissions. Using the MAC, nodes can define a MAC window indicating the amount of outstanding data (unacknowledged by the recipient) that can remain at any given time. Systems can determine the size of the MAC window based on Network Allocation Vector (NAV) data and other duration data transmitted during Request-to-Send (RTS) and Clear-to-Send (CTS) communications, a handshake operation, or any other communication mechanisms for exchanging information between nodes. By determining a MAC window which defines when nodes will transmit acknowledgments, nodes in a communication link can avoid losses in throughput due to delays in acknowledgment.

This disclosure focuses on an approach for defining a window size for full-duplex communication. The window size identifies for each node in a full-duplex communication mode how many data frames the node can send without having those frames acknowledged by the other node. The window size is fixed by a protocol, negotiated at a handshaking operation, established through information exchanged between nodes, and/or can be auto-tuned. The window size can be fixed based on data associated with the size of one or more of the frames from the first node and frames of the second node. One node may transmit data frames to the other node as long as the number of unacknowledged data frames does not reach the window size. Different examples of asymmetric frame sizes and symmetric frame sizes will be discussed.

We first turn to an example of two nodes communicating symmetric frames. In this case, the established window size can be one data frame, or alternatively, can allow for multiple data frames to be transmitted prior to receiving acknowledgments. For example, if each node is transmitting data with a frame size of 4 KB, the window size could be 1 frame for each node or more than 1 frame for each node. Any number of frames would work in a window size. For example, if the window size is 3 frames for the first node, then after three frames had been transmitted from the first node (and received by the second node), the first node cannot transmit any more data frames until it receives acknowledgement from the second node that one or more data frames have been received at the second node.

We now turn to an example of establishing and applying a window size in full-duplex communication for asymmetric frame sizes. Consider two nodes communicating in full-duplex mode, where the two nodes transmit asymmetric data frame sizes. The system (which can include the two communicating nodes) configured according to this disclosure can establish for each node a window size, which governs the number of sent, but unacknowledged, data frames remaining at the node. The nodes each send data as long as the number of unacknowledged frames at the node is less than the window size for that node. The acknowledgements are simultaneously or nearly simultaneously sent at the end of the window or when the conditions set forth by the window are met. The nodes communicate the respective data in full-duplex mode, with each node transmitting and receiving frames until the window size has been reached—i.e., the appropriate number of frames for that node have been transmitted without acknowledgement. If a node transmits the appropriate number of frames to the other node, according to the window size, the node stops transmitting any more data frames and waits for acknowledgments from the other node.

In a specific example that relates to frames being asymmetric, consider two nodes communicating in full-duplex mode, a first node having a frame size of 3 (which can be 3 KB, or defined in any units) and a second node having a frame size of 5 (which can be 5 KB, or defined in any units). The window sizes for each node can be set based on the number of maximum unacknowledged frames, which will minimize waiting time. In this example, as the nodes initiate communications, the window size may be determined to be 5 unacknowledged data frames received by the first node and 3 unacknowledged data frames received by the second node. When the total number of unacknowledged frames is equal to or greater than 5 received at the first node or 3 received at the second node, the window size is reached, or the condition defined by the window size is met, and the node stops sending additional data frames until it receives acknowledgment.

Determinations of window size can be made based on information received during a RTS(Request To Send)/CTS (Clear To Send) exchange, defined in a protocol, defined by an auto-tuning method, based on exchanged information at any time, or based on data received and interpreted. For example, if a node is receiving data with a frame size of 3 KB and transmitting data with a frame size of 4 KB, the node can configure or establish its window size to be 3 frames and the other node can configure or establish the window size to be 4. The window sizes can be communicated to each other, or, when each node is configured according to this disclosure, can be calculated by each node after the first data frames are communicated. Thus, when one node transmits the first 3 KB frame and receives a 4 KB frame, it will calculate or detect that the other node is transmitting 4 KB frames. Assuming there are no transmission errors on the data link, by the time the node sends 4 of its 3 KB frames, the other node will have transmitted 3 of its 4 KB frames, thus allowing the nodes to efficiently exchange acknowledgements and achieve minimal waiting time for both nodes.

The size of the window can be expressed in any format capable of communicating when to transmit acknowledgments. Exemplary formats include a number of received and/ or transmitted frames, a time, an amount of data, and bandwidth consumed.

These and other various embodiments of the disclosure are described in detail below. While specific implementations are described, it should be understood that this is done for illustration purposes only. Other components and configurations may be used without parting from the spirit and scope of the disclosure.

A brief introductory description of a basic general purpose system or computing device in FIG. 1 which can be employed to practice the concepts is disclosed herein. A more detailed description of creating windows which can increase bandwidth and communication node efficiency in full-duplex communications will then follow, accompanied by examples and variations. These variations shall be described herein as the various embodiments are set forth. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 100 is a small, handheld computing device, a desktop computer, or a computer server.

Although the exemplary embodiment described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

Figure 2:
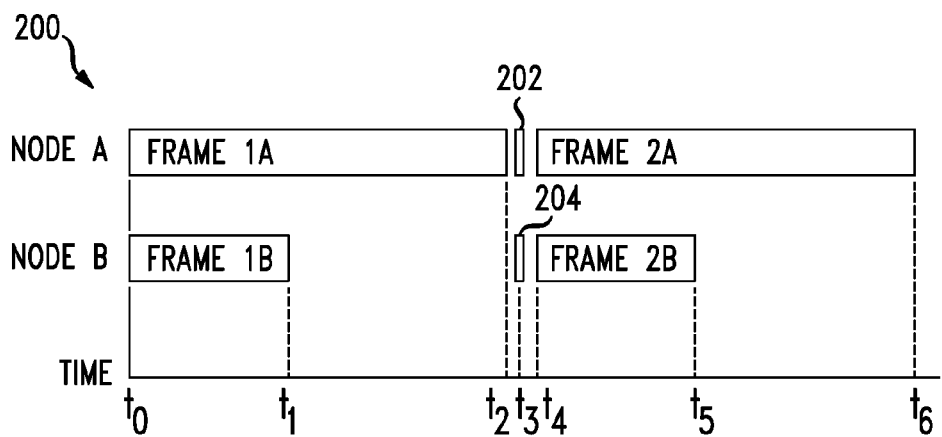
FIG. 2 illustrates an example of non-windowed flow control for asymmetric frame sizes.

Having disclosed some components of a computing system, the disclosure now turns to FIG. 2, which illustrates an example of non-windowed flow control for asymmetric frame sizes 200. In this example, node A and node B are communicating in full-duplex mode, with both nodes A and B simultaneously transmitting and receiving data. However, in this example, the data frames transmitted by the nodes are asymmetric and have different sizes. Specifically, node A is transmitting a data frame 1A beginning at time $t_0$ which is significantly larger than the data frame 1B transmitted from node B. Because node A is transmitting its large data frame 1A, node A cannot send an acknowledgment that it has received the frame 1B from node B until after the transmission of the large frame 1A ends at time $t_2$. Node B finishes the transmission of its smaller frame 1B at time $t_1$, resulting in node B operating not in full-duplex, but instead only operating in a receive mode until after node A finishes transmission of frame 1A at time $t_2$. Then, because both nodes A and B have finished transmitting and both nodes have received the respective data frames 1A and 1B, nodes A and B transmit acknowledgments 202, 204 at time $t_3$. This cycle continues with both nodes A and B sending additional data frames 2A and 2B starting at time $t_4$, again resulting in inefficient use of node B between times $t_5$ and $t_6$ because node B's frame 2B was completely transmitted by time $t_5$. While FIG. 2 illustrates simultaneous acknowledgments 202, 204 at time $t_3$, nevertheless, some inefficiency arises because node B has a period of time (between time $t_1$ and $t_2$ and between time $t_5$ and $t_6$) in which the node waits for an acknowledgement.

Figure 3:
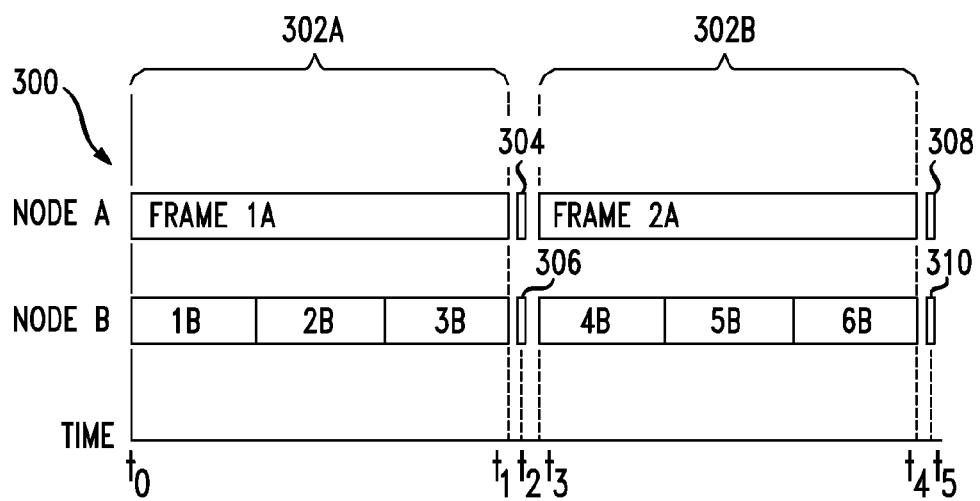
FIG. 3 illustrates a first example of windowed flow control for asymmetric frame sizes.

FIG. 3 illustrates an example of windowed flow control for asymmetric frame sizes 300, which can reduce the inefficiency seen in FIG. 2. The window size is defined based on the number of data frames that may be transmitted before receiving an acknowledgement for any of those data frames. In the example of FIG. 3, node A and node B are communicating in full-duplex mode, and have asymmetric frame sizes. Node A transmits frame 1A which is about 3 times the size of the frame 1B, 2B, or 3B transmitted by node B. The size of the frames can be detected, predetermined or communicated, or can be established after a first round of communications. If establishing the frame sizes is based on received frames, a system can determine if the data frames are of a constant or consistent size, then establish a window 302A based on the frame size. If the frames being transmitted do not have a constant or consistent size, a window size can be established so as to minimize the time that any node might have to wait for an acknowledgement to arrive from the node after filling its window with unacknowledged frames. In another configuration, the window size 302A can be tied to a specific condition, such as not sending/receiving acknowledgments of a defined number of data frames. For instance, if a node has transmitted/received four frames and not received/transmitted acknowledgments, the node can be configured so as not to send any further frames and transmit an acknowledgment upon the conclusion of current transmission.

In the example shown in FIG. 3, the frame sizes are known and window 302A is established having a size of 3 frames received at node A and 1 frame received at node B. The window size 302A defines how many data frames each node can transmit that may go unacknowledged before receving acknowledgments. For node A, this means that only a single frame 1A may be transmitted without acknowledgement, whereas node B may transmit up to three frames 1B, 2B and 3B before receiving acknowledgement. At time $t_1$, both node A and node B will cease transmitting their respective frames and transmit acknowledgment signals 304, 306 at time $t_2$. While timing elements are shown, the window size in this example is not established according to a particular time but rather is defined as how many unacknowledged frames can be sent (i.e., as long as the number of unacknowledged frames is less than the window size) before the acknowledgment is received.

The acknowledgments 304, 306 can be particular to an individual frame received, or the acknowledgments 304, 306 can be for multiple frames received during the window 302A. For example, at time $t_1$, when node A transmits the acknowledgment 304 of frames received during the transmission of node A's frame 1A, this acknowledgment 304 can be a single acknowledgement frame indicating reception of all three frames 1B, 2B, and 3B from node B, or the acknowledgment 304 can be three separate acknowledgments for each separate frame received respectively. The acknowledgment 306 from node B would, in this example, be only for frame 1A. If, however, node A had transmitted more than a single frame in the window 302A, the acknowledgment 306 could similarly be for a single frame or for multiple frames.

The transmission of the acknowledgments 304, 306 occurs at time $t_2$, and may occur simultaneously, in full-duplex, between nodes A and B. Typically, the acknowledgments are exchanged in the same frequency bin. In alternate configurations, nodes will transmit the data in full-duplex on a first channel, with the acknowledgments transmitted in a separate channel or frequency. In such configurations, acknowledgments transmitted at time t2 would continue to be transmitted simultaneously, but can provide less interference to the data channel.

After the simultaneous transmission of acknowledgments 304, 306 at time $t_2$, nodes A and B again proceed to transmit data frames based on the window 302B, this time transmitting frames 2A and 4B, 5B, and 6B, respectively. Following this second window 302B, which gets full at time $t_4$, the nodes A and B again transmit acknowledgments 308, 310 at time $t_5$. This process continues until communications are complete. The various frames can vary in number, size, and consistency in size.

Figure 4:
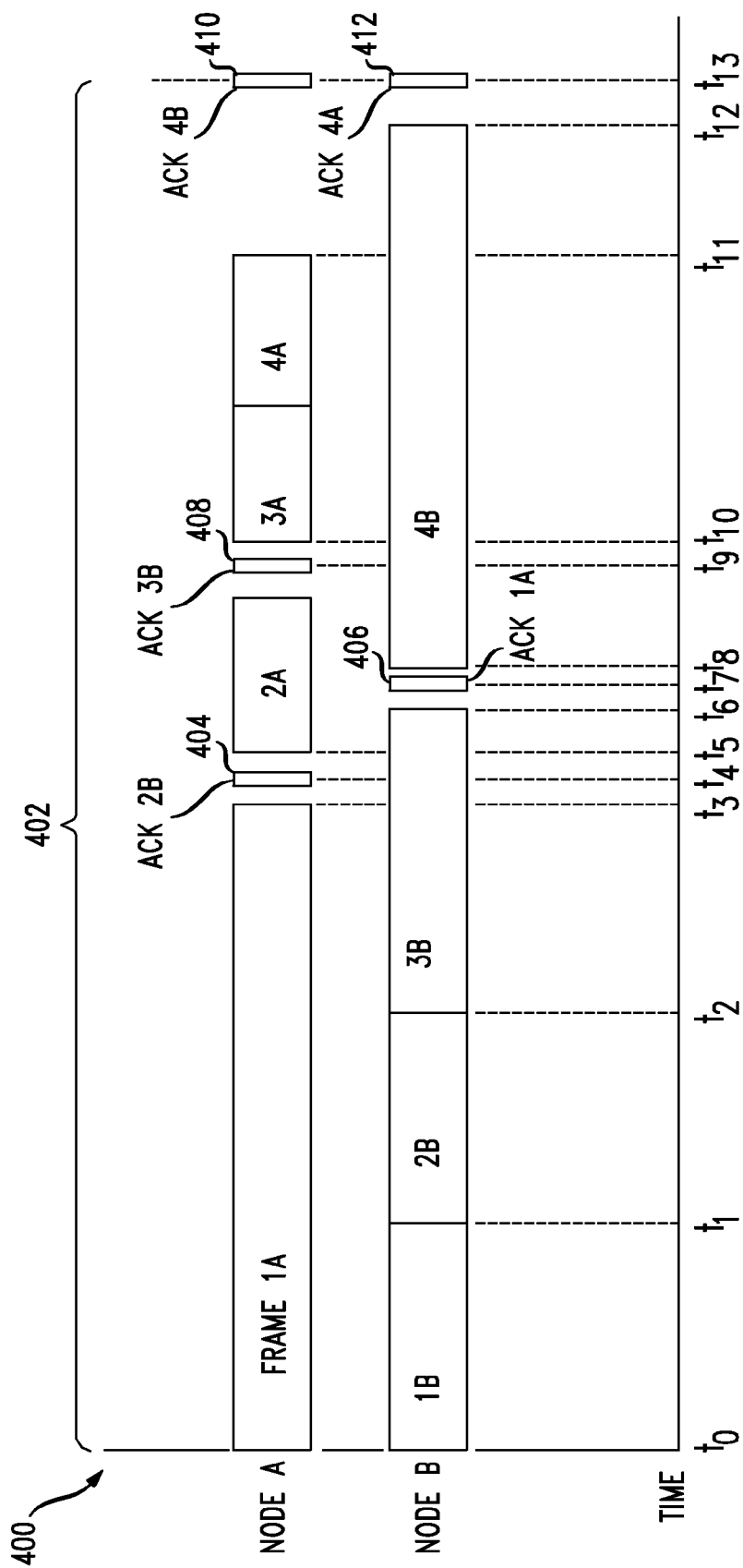
FIG. 4 illustrates a second example of windowed flow control for asymmetric frame sizes.

FIG. 4 illustrates a second example of windowed flow control for asymmetric frame sizes 400. As with FIG. 3, FIG. 4 has two nodes, node A and node B, again transmitting asymmetric data frames. However, in this example the sizes of the frames are not constant, as both node A and node B are transmitting data frames of varying sizes. Because the data frames are not of constant sizes, the window established is not tied to the frame sizes of either node A or node B. The window 402 can provide an opportunity to effectively 'reset' the communications between nodes A and B. This reset in turn can be useful in balancing the dual goals of reducing inefficiency when a given node is not transmitting and ensuring nodes properly transmit acknowledgments such that errors in the data can be corrected before impeding data processing.

In this illustration, nodes A and B each begin transmitting (in full-duplex) frames 1A and 1B, respectively, at time $t_0$. As node B at time $t_1$, finishes transmitting frame 1B, node B immediately continues to transmit frame 2B until time $t_2$, and subsequently frame 3B until time $t_6$, all while receiving frame 1A from node A which ends at time $t_3$. When node A finishes transmission at time $t_3$, it sends an acknowledgment of frame 2B at time $t_4$, thus reducing the number of acknowledged frames at node B to 0. The acknowledgment 2B of frame 2B 404 can acknowledge both frames 1B and 2B, or can acknowledge only frame 2B or only frame 1B depending on the transmission protocol being used and whether the frames were successfully transmitted. When the acknowledgment is only for frame 2B, the lack of acknowledgment for frame 1B indicates to node B that a retransmission of frame 1B is needed. Similarly, if the acknowledgment is only for frame 1B, retransmission of frame 2B will be needed after a predefined timeout period.

Upon transmitting the acknowledgment for frame 2B 404, node A begins transmitting frame 2A at time $t_5$. During transmission of frame 2A, node B completes transmission of frame 3B at time $t_6$, and has, by then, received all of frame 1A. Node B transmits an acknowledgment 406 of receipt of the frame 1A at time $t_7$, reducing the number of unacknowledged frames at node A to 0, then at time $t_8$ initiates transmission of frame 4B. During transmission of frame 4B, node A sends an acknowledgment 408 of frame 3B at time $t_9$, then transmits frames 3A and 4A beginning at time $t_{10}$, finishing transmission at time $t_{11}$.

At this point node A computes or establishes that the window 402 is nearing completion by comparing the data frames transmitted/received to the window size 402 to determine if the number of frames transmitted or received is less than or equal to the window size for that node. While the timing elements are shown in various figures, the timing of the acknowledgments is based on packets and frame sizes, and not based on a particular determined time. The timing estimate of acknowledgements is primarily based on the data, i.e., the number of packets or frame sizes. The final timing of when acknowledgements are exchanged can be updated after each received acknowledgement, however. The window size as well as any timing associated, if at all, with the simultaneous exchange of acknowledgements, can be updated based on any number of factors such as changing frame or packet size in packets/frames transmitted or received after a particular acknowledgement, protocol, frame sizes for one of both nodes in the communication, handshaking, or auto-tuning.

Returning to FIG. 4, node B continues transmitting frame 4B, which was previously determined to finish prior to the conditions of the window 402 being established. Upon completing the transmission of frame 4B (shown at time $t_{12}$), the conditions of the window 402 are met (at time $t_{13}$), and both node B and node A simultaneously transmit acknowledgments 410, 412 of any unacknowledged data. In this case, node A needs to acknowledge frame 4B and node B has yet to send acknowledgment of frames 3A and 4A. As illustrated, the nodes A, B only transmit acknowledgments 410, 412 of frames 4B and 4A. If the acknowledgments are configured to provide acknowledgment of more than one frame, it may be that all frames are recognized as received and a new cycle of full-duplex communications can begin, without need to retransmit any of the frames transmitted or received. FIGS. 2-4 provide general examples of identifying a window size for frame sizes used for transmissions between two nodes in full-duplex mode, which window size governs when simultaneous acknowledgments are sent.

Having disclosed some basic system components and concepts, the disclosure now turns to the exemplary method embodiment shown in FIG. 5. For the sake of clarity, the method is described in terms of an exemplary system 100 as shown in FIG. 1 configured to practice the method. The system can represent a node in a network where nodes communicate data between each other. The hardware shown in FIG. 1 is meant to be general and other known hardware configurations can be applied as well. The steps outlined herein are exemplary and can be implemented in any combination thereof, including combinations that exclude, add, modify, and/or change the order of certain steps.

An exemplary system 100 configured to practice an exemplary method can be a first node that first establishes, when a first frame size of a first frame size of first node data from the first node differs from a second frame size of second node data from a second node, a window size that governs when acknowledgments are simultaneously sent from the first node and the second node while the first node and the second node are in full-duplex mode (502). While this exemplary configuration is specifically for asymmetric data frame sizes, other configurations could establish window sizes based on symmetric data frame sizes, where the different nodes transmit data frames of identical size, bandwidth, or duration. The size or length of the window can be determined as a function of the first frame size and the second frame size, such as a least common multiple, or can be determined as a condition of specific circumstances. For example, the window might trigger upon a single node transmitting several frames and not receiving acknowledgment of those frames. Similarly, certain configurations of the system 100 can have the window trigger upon specific outside conditions being met, such as node movement, waning transmission power levels, waning reception power level, user input, or emergency/priority data. In addition, when the frame sizes are unknown, the window size can be determined after a single round of communications, after several rounds establishing frame sizes, or can be established based on a specific time, amount of data, or bandwidth communicated.

The first node, after establishing the window size, transmits first data (such as packets or frames) having a first frame size while receiving, from the second node, second data having the second frame size (504). The second node of the communication link similarly transmits data while receiving frames from the first node. This transmission/reception occurs simultaneously in a same frequency bin or frequency channels, i.e., in full-duplex mode. While the nodes are transmitting and receiving in a common frequency channel, the modulation, encoding, or amplitude of each signal can be different so as to differentiate the signals.

After receiving the second data, at a time associated with the window size, the first node transmits an acknowledgment of at least a portion of the second data to the second node (506). At this same time, the system 100 can receive an acknowledgment of at least a portion of the first data transmitted by the first node, also in full-duplex. The acknowledgments can be in the same channel/frequency as the full-duplex data previously transmitted, or can be in a separate channel exclusive to acknowledgments, request-to-send signals, clear-to-send signals, and other scheduling/coordination signals. The acknowledgments can be specific to a particular frame, can acknowledge multiple frames, or can be configured to acknowledge a portion of a group of frames, such as only two frames of three received. The acknowledgments can serve to acknowledge any previously unacknowledged data. Upon transmitting and receiving the acknowledgments, nodes then repeat the transmission of framed data in full-duplex until queued data is transmitted.

If a node is communicating with multiple nodes in a time-partitioned manner, windowing can be implemented as described above during full-duplex communications with any individual node. This window can be constant between the various nodes, or can shift based on the needs and requirements of the particular nodes currently communicating. As an example, consider if node A is communicating with nodes B and C. Node A transmits frames of size 6, node B transmits frames of size 3, and node C transmits frames of size 4. In this case, the system 100 establishes a window size of 12 divided by the respective frame sizes for each node, based on all three frame sizes. Therefore, during communications between nodes A and B, node A transmits 2 frames per window (i.e., 12/6) while node B transmits 4 frames per window (12/3). Node C transmits 3 frames per window (i.e., 12/4). Thus, the window size is determined or defined based on frame sizes for each transmitting node and causes each node to transmit data until the number of unacknowledged frames at the node while the number of frames is less than or equal to the window size calculated for the respective node. The window size can also be defined as the number of frames the node receives that are unacknowledged before sending an acknowledgment. During communications between nodes A and C, node A transmits 2 frames and node C transmits 3 frames. In other configurations, the window size can change specifically between only those nodes in a current communication link. In such a configuration, again using nodes A, B, and C, the window between nodes A and B could be size 6, i.e., because node A's frame size is 6 and node B's frame size is 3, the window size for node A would be 6/6 or 1 frame per window and for node B, the window size is 6/3 or 2 frames per window before an acknowledgement is sent. The window between nodes A and C could be 12, meaning that node A, with a frame size of 6, would transmit 12/6 or 2 frames per window and node C, with a frame size of 4, would transmit 12/4 or 3 frames per window, before waiting for an acknowledgement.

While the least common multiple provides an easy example of windows, certain configurations will use values or multiples well above the least common multiple. Again using the example of nodes A, B, and C, the window between nodes A and B, instead of 6 or 12, could be 24 or 36 (divided by the respective frame size for each node), despite those values not necessarily being the smallest windows possible. Such considerations can be made based on the processing capabilities of the system 100, as well as efficiency, bit-error-rates, and demand from other nodes.

The window size can also be dynamic in that if it is set at a certain size, then during full-duplex communications the system determines that the size should be increased or decreased, the system can adjust the size accordingly. This can occur automatically such that the acknowledgments are transmitted simultaneously after the number for frames is transmitted or received according to the respective window size for each node. Such an approach renders the transmission and acknowledgement process more efficient.

FIG. 6 illustrates another method aspect of this disclosure. This figure is presented from the viewpoint of the first node in a full duplex communication. The method includes transmitting from a first node to a second node a first frame having a first frame size (602), receiving, at the first node, and from a second node, a second frame having a second frame size, to yield a received second frame, wherein the transmitting and receiving result in or are associated with full-duplex communication between the first node and the second node (604). For example, the transmitting in full-duplex means that the nodes are communicating in a full duplex mode—not necessarily that they nodes are always simultaneously communicating data. At a particular point in time, one node may be transmitting a frame while the other node may have completed its frame transmission and is waiting to send an acknowledgement. Accordingly, the nodes should be in a full-duplex mode but do not necessarily have to be currently transmitting in both directions.

Next, the method includes determining a window size which governs when the first node transmits an acknowledgement of the received second frame (or of one or more transmitted frames). The window size also governs when the second node transmits an acknowledgement of its receipt of the first frame. The window size is determined based on at least one of a protocol, a negotiation between the first node and the second node, the first frame size, the second frame size, and auto-tuning (606). Finally, the method includes, after receiving the received second frame and according to the window size, transmitting the acknowledgment of the second frame to the second node (608).

Transmitting the acknowledgment of the second frame to the second node and receiving the acknowledgement associated with the first frame from the second node can occur in the same frequency bin.

An example of the window size being determined by protocol is where the system establishes via a high level protocol that frame sizes for the different nodes will be established in a certain way or pattern. For example, the system may determine that the first node will transmit frames of size 5 for the first 100 frames, and the second node will transmit frames at size 10 for 100 frames, and then both nodes will switch and the first node will transmit frame sizes of 10 for 200 frames while the second node will transmit frames of size 5 for 200 frames. Any protocol contemplated for transmitting frame sizes for particular durations of data, time or for other reasons can be established as part of a protocol.

The different nodes can negotiate the window size as well. As they start communicating with each other, and the frame sizes for frames received from the other node are identified via detection or by other specific data transmitted, the nodes can negotiate what the window size will be that will define how many unacknowledged frames each node can transmit or receive before an acknowledgement is sent. A timing element could also be involved. For example, the system could establish that the window size will remain for 1 minute or 5 minutes or any period of time before it is renegotiated. The time of day could govern when window sizes are reevaluated. Other data could also be included in an analysis of when or whether a window size should be renegotiated. For example, an evaluation could occur in which the timing between time $t_{13}$ and $t_{12}$ and the time between $t_{13}$ and $t_{11}$ is analyzed from FIG. 4 That timing represents periods of time in which data is not being transmitted and/or received by at least one of the nodes. The system could have a protocol established where if an aspect of that timing exceeds a threshold, then a new window size is established or renegotiated. In another aspect, based on this data or other data, one or both nodes could provide an instruction to adjust the frame size so that a more efficient window size can be established that enables simultaneous acknowledgements to be sent with the maximum amount of data communicated before the acknowledgement.

For example, FIG. 4 shows acknowledgements sent at time $t_{13}$. Frame 4A however was transmitted ending at time $t_{11}$ with some time between the end of that transmission and the acknowledgment 410 of node A's reception of frame 4B. The system could have instructed node A to transmit a larger frame 4A such that more data could be sent given the system's knowledge of the window size and the size of frame 4B. In this manner, the tuning of the window size could also encompass some tuning of the size of frames transmitted such that they fit more perfectly within the window size.

In another example, FIG. 2 shows frame 1A and frame 1B being of different window sizes. The system could provide an instruction after the exchange of frame 1A and 1B such that frame 2B, rather than being about half the size of frame 2A, was transmitted from node B in the same size or about the same size as frame 2A, which would increase the efficiency of the full-duplex communication.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply to full-duplex communications for digital and analog communications. The reference to "simultaneous" communication is also not intended to be a literal exact timing of when acknowledgements are exchanged between nodes. There may be some reasonable variation in when the acknowledgements are exchanged. For example, FIG. 4 may provide a window in which acknowledgement 410 is transmitted from node A slightly before acknowledgement 412 since node A completed its transmission of frame 4A prior to the receiving the complete frame 4B from node B. In other words, the definition for the window size may include some minor variation in when acknowledgements are exchanged while maintaining the principle that the window is defined as how long nodes can transmit data until the number of unacknowledged frames at the node is equal to or less than the window size. Various modifications and changes may be made to the principles described herein without following the example embodiments and applications illustrated and described herein, and without departing from the spirit and scope of the disclosure.

We claim:
1. A method comprising:
transmitting, from a first node to a second node, a first frame having a first frame size;
receiving, at the first node, and from the second node, a second frame having a second frame size, to yield a received second frame, wherein the transmitting and receiving comprise full-duplex communication in a common frequency channel between the first node and the second node;
determining a window size which governs when the first node transmits a first acknowledgement of the received second frame and when the second node transmits a second acknowledgement of receipt of the first frame, the window size being determined based on one of a protocol, a negotiation between the first node and the second node, the first frame size, the second frame size, and auto-tuning, and wherein the window size allows for non-simultaneous transmissions of acknowledgments in full-duplex in the common frequency channel; and
after receiving the received second frame and according to the window size, transmitting the first acknowledgement of the second frame to the second node in full-duplex in the common frequency channel while receiving data in the common frequency channel.

2. The method of claim 1, further comprising receiving the second acknowledgment associated with the first frame from the second node while transmitting the first acknowledgment.

3. The method of claim 1, wherein establishing the window size is based on one of a tuning of a frame size and a least common multiple of the first frame size and the second frame size.

4. The method of claim 1, wherein the first frame and the second frame are communicated in a single communication channel.

5. The method of claim 2, wherein transmitting the acknowledgment of the second frame to the second node and receiving the second acknowledgement associated with the first frame from the second node occur in a same frequency bin.

6. The method of claim 1, wherein the first frame size differs from the second frame size.

7. The method of claim 1, wherein the window size is conditional upon a specific condition.

8. The method of claim 7, wherein the specific condition is one of transmitting a number of unacknowledged frames, a change in power level associated with the second data, and emergency transmission.

9. A system comprising:
a processor; and
a computer-readable storage medium having instructions stored which, when executed by the processor, cause the processor to perform operations comprising:
transmitting, from a first node to a second node, a first frame having a first frame size;
receiving, at the first node, and from the second node, a second frame having a second frame size, to yield a received second frame, wherein the transmitting and receiving comprise full-duplex communication in a common frequency channel between the first node and the second node;
determining a window size which governs when the first node transmits a first acknowledgement of the received second frame and when the second node transmits a second acknowledgement of receipt of the first frame, the window size being determined based on one of a protocol, a negotiation between the first node and the second node, the first frame size, the second frame size, and auto-tuning, and wherein the window size allows for non-simultaneous transmissions of acknowledgments in full-duplex in the common frequency channel; and
after receiving the received second frame and according to the window size, transmitting the first acknowledgment of the second frame to the second node in full-duplex in the common frequency channel while receiving data in the common frequency channel.

10. The system of claim 9, the computer-readable storage medium having additional instructions stored which, when executed by the processor, cause the processor to perform operations comprising receiving the second acknowledgment associated with the first frame from the second node while transmitting the first acknowledgment.

11. The system of claim 9, wherein establishing the window size is based on one of a tuning of a frame size and a least common multiple of the first frame size and the second frame size.

12. The system of claim 9, wherein the first frame and the second frame are communicated in a single communication channel.

13. The system of claim 12, wherein transmitting the acknowledgment of the second frame to the second node and receiving the second acknowledgement associated with the first frame from the second node occurs in a same frequency bin.

14. The system of claim 9, wherein the first frame size differs from the second frame size.

15. The system of claim 9, wherein the window size is conditional upon a specific condition.

16. The system of claim 15, wherein the specific condition is one of transmitting a number of unacknowledged frames, a change in power level associated with the second data, and emergency transmission.

17. A computer-readable storage medium having instructions stored which, when executed by a computing device, cause the computing device to perform a operations comprising:
transmitting, from a first node to a second node, a first frame having a first frame size;
receiving, at the first node, and from the second node, a second frame having a second frame size, to yield a received second frame, wherein the transmitting and receiving comprise full-duplex communication in a common frequency channel between the first node and the second node;
determining a window size which governs when the first node transmits a first acknowledgement of the received second frame and when the second node transmits a second acknowledgement of receipt of the first frame, the window size being determined based on one of a protocol, a negotiation between the first node and the second node, the first frame size, the second frame size, and auto-tuning, and wherein the window size allows for non-simultaneous transmissions of acknowledgments in full-duplex in the common frequency channel; and
after receiving the received second frame and according to the window size, transmitting the first acknowledgment of the second frame to the second node in full-duplex in the common frequency channel while receiving data in the common frequency channel.

18. The computer-readable storage medium of claim 17, having additional instructions stored which, when executed by the computing device, cause the computing device to perform operations comprising receiving the second acknowledgment associated with the first frame from the second node while transmitting the first acknowledgment.

19. The computer-readable storage medium of claim 17, wherein establishing the window size is based on one of a tuning of a frame size and a least common multiple of the first frame size and the second frame size.

20. The computer-readable storage medium of claim 17, wherein the first frame and the second frame are communicated in a single communication channel.

* * * * *